(12) United States Patent
Huang et al.

(10) Patent No.: US 10,662,097 B2
(45) Date of Patent: May 26, 2020

(54) APPARATUS FOR SEWAGE DEEP BED DENITRIFICATION WITH HIGH POLLUTANT CARRYING CAPACITY AND LOW ENERGY CONSUMPTION, AND METHOD FOR RUNNING THE SAME

(71) Applicant: NANJING UNIVERSITY, Nanjing (CN)

(72) Inventors: Hui Huang, Nanjing (CN); Qing Wang, Nanjing (CN); Hong-qiang Ren, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 325 days.

(21) Appl. No.: 15/631,037

(22) Filed: Jun. 23, 2017

(65) Prior Publication Data

US 2018/0099885 A1 Apr. 12, 2018

(30) Foreign Application Priority Data

Oct. 12, 2016 (CN) .......................... 2016 1 0892700

(51) Int. Cl.
*C02F 3/12* (2006.01)
*C02F 3/30* (2006.01)
*B01D 21/00* (2006.01)
*B01D 29/50* (2006.01)
*B01D 29/60* (2006.01)
(Continued)

(52) U.S. Cl.
CPC .............. *C02F 3/121* (2013.01); *B01D 21/00* (2013.01); *B01D 29/50* (2013.01); *B01D 29/60* (2013.01); *C02F 3/12* (2013.01); *C02F 3/30* (2013.01); *C02F 3/305* (2013.01); *B01D 29/00* (2013.01); *B01D 35/00* (2013.01); *C02F 1/4693* (2013.01); *C02F 1/66* (2013.01); *C02F 3/00* (2013.01); *C02F 3/06* (2013.01); *C02F 3/105* (2013.01); *C02F 3/107* (2013.01); *C02F 2101/163* (2013.01); *C02F 2101/30* (2013.01);
(Continued)

(58) Field of Classification Search
None
See application file for complete search history.

(56) References Cited

U.S. PATENT DOCUMENTS 5,306,422 A * 4/1994 Krofta ................ B01D 21/0045
210/151
6,015,496 A * 1/2000 Khudenko .............. C02F 3/006
210/603
(Continued)

*Primary Examiner* — Jonathan M Peo
(74) *Attorney, Agent, or Firm* — W & K IP

(57) ABSTRACT

The invention discloses an apparatus for sewage deep denitrification with high pollutant carrying capacity and low energy consumption and a method for running the same, characterized in that: the apparatus mainly includes a settling tank, an electrodialysis device, a pH adjusting tank, a first chemical storage tank, a biofilter, a second chemical storage tank, a redox potential measuring device, a backwash pump, and a clean water tank, wherein the biofilter is provided with a gas collecting device, an uniform water distributor, a first filter bed, a second filter bed, a third filter bed, and a fourth filter bed sequentially from up to down, a second dosing port is arranged underneath the second filter bed, and the second chemical storage tank is communicated to the second dosing port respectively through a first flow path and a second flow path.

10 Claims, 1 Drawing Sheet

(51) Int. Cl.
  *C02F 101/16* (2006.01)
  *C02F 3/10* (2006.01)
  *C02F 101/30* (2006.01)
  *C02F 3/06* (2006.01)
  *C02F 1/66* (2006.01)
  *C02F 1/469* (2006.01)
  *B01D 29/00* (2006.01)
  *B01D 35/00* (2006.01)
  *C02F 3/00* (2006.01)

(52) U.S. Cl.
  CPC ...... *C02F 2209/04* (2013.01); *C02F 2303/16* (2013.01); *Y02W 10/15* (2015.05)

(56) References Cited

U.S. PATENT DOCUMENTS

2011/0203992 A1* 8/2011 Liu .................. C02F 1/286
                                                  210/607
2014/0178951 A1* 6/2014 Ross ................ C07C 51/48
                                                  435/134

* cited by examiner

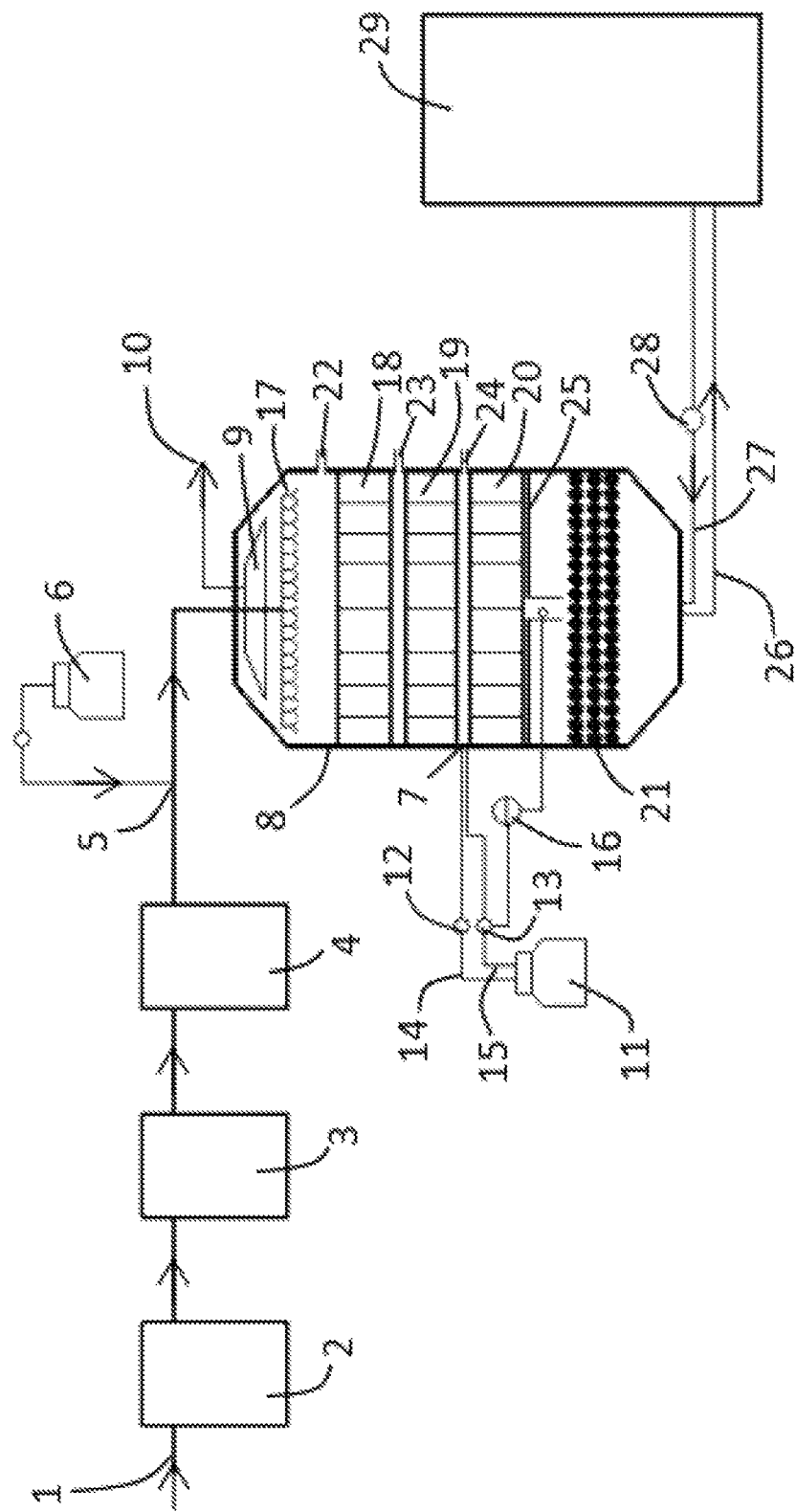

ial-ly disclosed at Apr. 9, 2014, discloses a patent application document named "Intelligent and Precise Carbon-Source Dosing System for Denitrification Deep-Bed Filter", the invention disclosed in the document relates to an intelligent and precise carbon-source dosing system for a denitrification deep-bed filter, which is provided with a water inlet, a COD inlet water detector, a dosing meter pump, an inlet water meter pump, a central control system, a dissolved oxygen meter, a pH meter, a thermometer, a denitrification deep-bed filter, a COD outlet water detector, a water outlet, and a nitrate analyzer of the water outlet and inlet, wherein the carbon-source dosage is controlled through the central control system according to the collected COD, flow rate, DO, temperature and pH value signal. Chinese patent No. 201110022603.8, which is published at Jul. 4, 2012, discloses a patent application document named "Real-Time Automatic Backwash Control System for Denitrification Filter and Method for Operaing the Same", the invention disclosed in the document relates to a real-time automatic backwash control system for denitrification filter and a method for operating the same, the system is provided with an on-line turbidity sensor, a nitrate sensor and a turbidity detector, and a nitrate detector arranged in the denitrification filter, and is also provided with a process controller and an industrial computer; the invention also, relates to a method for operating the backwash control system, which includes steps of: 1. starting of the control system; 2. parameter processing and determining; 3. water discharging process; 4. gas-only backwashing; 5. gas-water combined backwashing; and 6. water-only backwashing. For these patents, the cost is reduced by optimizing the dosage of the externally added carbon source, and the filter is backwashed in real time to ensure the processing effect of the filter, but the pollutant carrying capacity of the filter itself is not increased and the influence of DO on the processing effect of the filter is not reduced, and thus problems such as high running cost and complex operation.

APPARATUS FOR SEWAGE DEEP BED DENITRIFICATION WITH HIGH POLLUTANT CARRYING CAPACITY AND LOW ENERGY CONSUMPTION, AND METHOD FOR RUNNING THE SAME

CROSS-REFERENCE TO RELATED APPLICATIONS

This claims priority to Chinese Patent Application No. 201610892700.5 with a filing date of Oct. 12, 2016. The content of the aforementioned application, including any intervening amendments thereto, is incorporated herein by reference.

TECHNICAL FIELD

The invention belongs to the field of advanced treatment of sewage, and in particular relates to an apparatus for sewage deep denitrification with high pollutant carrying capacity and low energy consumption and a method for running the same, which can improve the pollutant carrying capacity of the filtering material in a significantly effective manner, reduce the inhibition action of dissolved oxygen (DO) on the denitrification effect, and meanwhile decrease the externally added carbon source.

BACKGROUND OF THE PRESENT INVENTION

The secondary biochemical effluent of a sewage treatment plant generally still has a certain concentration of pollutants such as nitrogen, phosphorus and suspended matters, which makes a great threat to the eco-environment and human beings; and in recent years China continuously improves the discharge standard of municipal sewage, and different regions also successively issue a series of planning and policies of energy saving and emission reduction. Therefore, it is of extremely urgent to upgrade and reconstruct the existing sewage treatment plant.

A denitrification biological nitrogen removal apparatus is widely applied in sewage deep-denitrification due to its advantages such as small footprint, convenient running management, and great processing effect. The working principle of the apparatus is that, when the sewage flows through a filtering material contained within the filter, a biomembrane adhered on the filtering material reduces nitrite and nitrate into nitrogen gas under an anaerobic condition; and meanwhile under the physical interception and absorption actions of the filtering material, the suspended solids contained in the inlet water are also removed. The COD (chemical oxygen demand) of the secondary biochemical effluent is generally low, but the denitrifying bacteria needs to consume the COD for nitrogen removal, and thus it needs to additionally add an externally added carbon source, which increases the running cost; furthermore the effluent of the secondary sedimentation tank often contains a certain concentration of DO, and thus due to the presence of DO and the carbon source, it will result in reproduction of heterotrophic bacteria on the surface of the filtering material of the filter bed, and under the coaction of the heterotrophic bacteria and the suspended solids, the surface layer of the filtering material is liable to be clogged and thus the processing effect is influenced.

To ensure the processing effect and reduce the running cost, currently most solving methods often start with precise control of externally added carbon sources and real-time

SUMMARY OF PRESENT INVENTION

For problems existed in the prior art that the surface layer of the filter is liable to be clogged as a result of the DO and suspended solids contained in the inlet water and thus the pollutant carrying capacity of the filter is reduced and it needs to increase the dosage of carbon sources, the technical problem to be solved by the invention is: providing an apparatus for sewage deep denitrification with high pollutant carrying capacity and low energy consumption and a method for running the same, which are capable of increasing the pollutant carrying capacity of the filter effectively and reducing the carbon-source dosage.

To solve the above-mentioned technical problems, the invention adopts the following technical solution:

A apparatus for sewage deep denitrification with high pollutant carrying capacity and low energy consumption, mainly includes: a settling tank, an electrodialysis device, a pH adjusting tank, a first chemical storage tank, a biofilter, a second chemical storage tank, a redox potential measuring device, a backwash pump, and a clean water tank, wherein the settling tank, the electrodialysis device, the pH adjusting tank and the biofilter are connected through tubes, the first chemical storage tank is communicated into the tubes of the pH adjusting tank and the biofilter through a first dosing port, the biofilter is provided with a gas collecting device, a uniform water distributor, a first filter bed, a second filter bed, a third filter bed, and a fourth filter bed sequentially from up to down, a certain distance is arranged between the first filter bed and the second filter bed and between the second filter bed and the third filter bed, a supporting plate is arranged at the bottom of the third filter bed, an opening protruding downward is arranged at the middle of the supporting plate, the electrode of the redox potential measuring device is introduced into the opening, the fourth filter bed is located underneath the opening at the middle of the supporting plate, a second dosing port is arranged underneath the second filter bed, the second chemical storage tank is communicated into the second dosing port through a first flow path and a second flow path respectively, a first pump is arranged on the first flow path, a second pump is arranged on the second flow path, the redox potential measuring device is connected with the second pump through a wire, the bottom end of the biofilter is connected with the clean water tank through a treated-sewage discharging pipe, and the backwash pump is arranged between the clean water tank and the bottom end of the biofilter through a backwash pipe.

Furthermore, in the aforementioned technical solution, a first outlet of backwash water, a second outlet of backwash water and a third outlet of backwash water are respectively arranged above the first filter bed, the second filter bed and the third filter bed.

Furthermore, in the aforementioned technical solution, the uniform water distributor consists of fractionation water distributing devices respectively comprising a water inlet manifold, a main pipe, a branch pipe and a water distributor having uniformly-arranged water distributing holes.

Furthermore, in the aforementioned technical solution, the filling material of the first filter bed is zeolite with a selected particle size of 7-8 mm and a density of 2.0-2.4 $g/cm^3$.

Furthermore, in the aforementioned technical solution, the filling material of the second filter bed is vermiculite with a selected particle size of 1-3 mm.

Furthermore, in the aforementioned technical solution, the filling material of the third filter bed consists of quartz sand with a selected particle size of 3-4.2 mm, a density of 2.8-3.0 $g/cm^3$, and a porosity greater than 55.

Furthermore, in the aforementioned technical solution, the filtering material used in the fourth filter bed consists of 10-20 parts of tuff, 2-10 parts of weakly-acidic clay, 1-5 parts of coral powder, 1-6 parts of coconut shell charcoal, 10-40 parts of ceramic powder, and 16-25 parts of organic foaming material by weight, and the manufacturing method of the filtering material is: mixing the tuff, the weakly-acidic clay, the coral powder, the coconut shell charcoal, the ceramic wool to obtain a mixture; adding water of 5-20 times the volume of the mixture and stirring to form a mixed solution; soaking the organic foaming material into the mixed solution for 1-3 h; and then heating the soaked organic foaming material to a temperature at which the organic foaming material is gasified and the mixture is sintered, thereby forming the filtering material.

Furthermore, in the aforementioned technical solution, the chemicals contained in the first chemical storage tank is a mixed solution of sodium acetate and methanol with a molar ratio thereof of 1:3.

Furthermore, in the aforementioned technical solution, the chemicals contained in the second chemical storage tank is a solution of ferrous chloride with a concentration of 3-10 mg/L.

A sewage deep-denitrification processing method which employs the apparatus for sewage deep denitrification with high pollutant carrying capacity and low energy consumption, includes the steps of:

(1) introducing a secondary biochemical effluent into a settling tank through a raw-water inlet to perform preliminary sedimentation, then introducing into a electrodialysis device to perform electrolysis, continually introducing into a pH adjusting tank to adjust the pH value to 5.0-7.0, wherein the chemical solution within a first chemical storage tank is fed through a first dosing port into a tube connecting the pH adjusting tank to a biofilter, such that the chemical solution enters the biofilter along with the sewage, making the COD/N of the externally added carbon source in the inlet water=2;

(2) first passing the sewage through a first filter bed via a uniform water distributor, wherein suspended solids with large particle sizes in the inlet water is removed under the absorption and interception actions of zeolite, and meanwhile a small amount of ammonia nitrogen contained in the inlet water is also removed through absorption, such that the suspended solids with large particle sizes and parts of DO are removed;

(3) passing the sewage into the second filter bed after going through the first filter bed, wherein due to the aquosity of vermiculite, the effective volume of the second filter bed is increased, such that the retention time of waterpower is prolonged, which further consumes the DO contained in the inlet water; and meanwhile due to the high aquosity of the vermiculite, a stable water-bearing layer can be formed in the vermiculite layer to avoid reoxygenation during cutoff or short-circuiting;

(4) passing the sewage discharged from the second filter bed into a third filter bed, and opening a first pump to enable a solution of ferrous chloride within a second chemical storage tank to enter a third filter bed along with the water flow via a first flow path; wherein denitrifying bacteria reduce nitrate and nitrite into nitrogen by using a carbon source contained in the inlet water, and meanwhile some nitrate iron-oxidizing bacteria oxidize ferrous iron into ferric iron by using oxygen contained in nitrate and at the same time is reduced into nitrogen; the nitrogen is collected through a gas collecting device and discharged from a gas outlet, suspended solids with small particle sizes are absorbed and intercepted, and meanwhile due to flocculation and adsorption of the ferric iron, the content of suspended solids contained in the outlet water is lower;

(5) flowing the sewage out from an opening underneath a supporting plate after going through the third filter bed, and detecting the degree of the aforementioned redox reaction via an electrode of a redox potential measuring device, and then if the degree of the redox reaction is not sufficient, turning the second pump on to enable a solution of ferrous chloride within the second chemical storage tank to enter the third filter bed along with the water flow via a second flow path, thereby increasing the concentration of the solution of ferrous chloride in the sewage and facilitating the progress of the redox reaction, and otherwise turning the second pump off to reduce the concentration of the solution of ferrous chloride contained in the sewage, thereby achieving the action of automatic control; and (6) continually passing the sewage through a fourth filter bed to perform further filtration and purification through the filtering material;

wherein the treated water enters a clean water tank through a treated-sewage discharging pipe; a backwash pump is turned on to use a portion of water contained in the clean water tank for backwash, the backwash is divided into three phases, wherein in a first phase of backwashing the third filter bed a first outlet of backwash water and a second outlet of backwash water are turned off to make the backwash water be discharged via a third outlet of backwash water, in a second phase of backwashing the second filter bed, the first outlet of backwash water and the third outlet of backwash water are turned off to make the backwash water be discharged via the second outlet of backwash water, and in a third phase of backwashing the first filter bed, the second outlet of backwash water and the third outlet of backwash water are turned off to make the backwash water be discharged via the first outlet of backwash water, such that the backwash water flows back into a secondary sedimentation tank, and a portion of water which reaches the standard is discharged.

The denitrification filter apparatus of the invention is provided with 4 layers of filter beds, which is capable of intercepting and removing the pollutant in multiple fractions, reducing the influence of the DO on the denitrification action, and improving the pollutant carrying capacity of the filter. The DO of the sewage entering the quartz sand filtering-material layer can be reduced from 6.8 mg/L to 3.2 mg/L, and thus the carbon-source dosage is greatly reduced, such that the externally applied COD/N=3-5 is reduced to CON/N=1.9-2.2; the fractionated interception of the suspended solids achieves an excellent effect of deeply intercepting the suspended matters in the filter, such that the backwash cycle of the filter is prolonged from generally 15-20 h to 27-30.5 h.

As compared with the prior art, the beneficial effects of the present invention are as follows:

(1) The apparatus of the invention achieves interception and removal of suspended solids with relatively large and small particle sizes in multiple stages; it achieves overall pollutant carrying in the filtering material of the filter bed through actions of respective layers of 4-layer filter bed, and the respective filter beds are spaced apart from each other, such that the running cycle of the filter is prolonged; and by arranging multiple backwash outlets, a thorough backwash can be performed on respective filter beds in each time, and thus the backwash times can be decreased as a whole.

(2) The second filter bed of the invention is a vermiculite layer, and due to the high aquosity of vermiculite, the internal effective volume of the filter can be increased appropriately, such that the retention time of waterpower is prolonged, and a stable water-bearing layer is formed to avoid reoxygenation, reduce the possibility of clogging the quartz sand filtering material, and meanwhile reduce the dosage of carbon sources and the running cost.

(3) In the invention, a ferrous chloride doser is disposed underneath the second filter bed to feed ferrous chloride into the water flow, in which the nitrate iron-oxidizing bacteria can oxidize ferrous iron into ferric iron by using the oxygen contained in the nitrate nitrogen, and meanwhile the nitrate nitrogen is reduced into nitrogen gas, which further reduce the dosage of carbon sources, and meanwhile due to flocculation and adsorption of the ferric iron, the content of suspended solids contained in the outlet water is lower; the backwash water is discharged into the secondary sedimentation tank, thereby improving the mud-water separation effect of secondary sedimentation tank, making the operation management be convenient, and obtaining outlet water with high water quality; the redox potential measuring device of the invention can achieve automatic control of the dosage added into the second chemical storage tank, thereby significantly improving the purification efficiency; and the fourth filter bed of the invention is formed of a newly developed filtering material and is capable of further purifying and absorbing the pollutant, thereby significantly improving the water quality of the final outlet water.

DESCRIPTION OF THE DRAWINGS

FIG. 1 is a schematic structure view of the invention;

wherein, 1—raw water inlet, 2—settling tank, 3—electrodialysis device, 4—pH adjusting tank, 5—first dosing port, 6—first chemical storage tank, 7—second dosing port, 8—biofilter, 9—gas collecting device, 10—gas outlet, 11—second chemical storage tank, 12—first pump, 13—second pump, 14—first flow path, 15—second flow path, 16—redox potential measuring device, 17—uniform water distributor, 18—first filter bed, 19—second filter bed, 20—third filter bed, 21—fourth filter bed, 22—first outlet of backwash water, 23—second outlet of backwash water, 24—third outlet of backwash water, 25—supporting plate, 26—treated-sewage discharging pipe, 27—backwash pipe, 28—backwash pump, and 29—clean water tank.

DETAILED DESCRIPTION OF PREFERRED EMBODIMENTS

For further understanding the disclosure of the invention, the invention be further described in details in connection with the Detailed Description:

Example 1

A apparatus for sewage deep denitrification with high pollutant carrying capacity and low energy consumption, mainly includes: a settling tank 2, an electrodialysis device 3, a pH adjusting tank 4, a first chemical storage tank 6, a biofilter 8, a second chemical storage tank 11, a redox potential measuring device 16, a backwash pump 28, and a clean water tank 29, wherein the settling tank 2, the electrodialysis device 3, the pH adjusting tank 4 and the biofilter 8 are connected through tubes, the first chemical storage tank 6 is communicated into the tubes of the pH adjusting tank 4 and the biofilter 8 through a first dosing port 5, the biofilter 8 is provided with a gas collecting device 9, a uniform water distributor 17, a first filter bed 18, a second filter bed 19, a third filter bed 20, and a fourth filter bed 21 sequentially from up to down; a first outlet of backwash water 22, a second outlet of backwash water 23, and a third outlet of backwash water 24 are respectively arranged above the first filter bed 18, the second filter bed 19, and the third filter bed 20; the uniform water distributor 17 consists of fractionation water distributing devices respectively comprising a water inlet manifold, a main pipe, a branch pipe and a water distributor having uniformly-arranged water distributing holes; a certain distance is arranged between the first filter bed 18 and the second filter bed 19 and between the second filter bed 19 and the third filter bed 20, a supporting plate 25 is arranged at the bottom of the third filter bed 20, an opening protruding downward is arranged at the middle of the supporting plate 25, the electrode of the redox potential measuring device 16 is introduced into the opening, the fourth filter bed 21 is located underneath the opening at the middle of the supporting plate 25, a second dosing port 7 is arranged underneath the second filter bed 19, the second chemical storage tank 11 is communicated into the second dosing port 7 through a first flow path 14 and a second flow path 15 respectively, a first pump 12 is arranged on the first flow path 14, a second pump 13 is arranged on the second flow path 15, the redox potential measuring device 16 is connected with the second pump 13 through a wire, the bottom end of the biofilter 8 is connected with the clean water tank 29 through a treated-sewage discharging pipe 26, and the backwash pump 28 is arranged between the clean water tank 29 and the bottom end of the biofilter 8 through a backwash pipe 27.

The filling material of the first filter bed 18 is zeolite with a selected particle size of 7 mm and a density of 2.0 g/cm$^3$; the filling material of the second filter bed 19 is vermiculite with a particle size of 1 mm; the filling material of the third filter bed 20 consists of quartz sand with a selected particle size of 3 mm, a density of 2.8 g/cm$^3$, and a porosity greater than 55%; the filtering material used in the fourth filter bed 21 consists of 10 parts of tuff, 2 parts of weakly-acidic clay, 1 parts of coral powder, 1 parts of coconut shell charcoal, 10 parts of ceramic powder, and 16 parts of organic foaming material by weight, and the manufacturing method of the filtering material is: mixing the tuff, the weakly-acidic clay, the coral powder, the coconut shell charcoal, the ceramic wool to obtain a mixture; adding water of 5 times the volume of the mixture and stirring to form a mixed solution; soaking the organic foaming material into the mixed solution for 1 h; and then heating the soaked organic foaming material to a temperature at which the organic foaming material is gasified and the mixture is sintered, thereby forming the filtering material.

The chemicals contained in the first chemical storage tank 6 is a mixed solution of sodium acetate and methanol with a molar ratio thereof of 1:3; and the chemicals contained in the second chemical storage tank 11 is a solution of ferrous chloride with a concentration of 3 mg/L.

A sewage deep-denitrification processing method which employs the apparatus for sewage deep denitrification with high pollutant carrying capacity and low energy consumption, includes the steps of:

(1) introducing a secondary biochemical effluent into a settling tank 2 through a raw-water inlet 1 to perform preliminary sedimentation, then introducing into a electrodialysis device 3 to perform electrolysis, continually introducing into a pH adjusting tank 4 to adjust the pH value to 7.0, wherein the chemical solution within a first chemical storage tank 6 is fed through a first dosing port 5 into a tube connecting the pH adjusting tank 4 to a biofilter 8, such that the chemical solution enters the biofilter 8 along with the sewage, making the COD/N of the externally added carbon source in the inlet water=2;

(2) first passing the sewage through a first filter bed 18 via a uniform water distributor 17, wherein suspended solids with large particle sizes in the inlet water is removed under the absorption and interception actions of zeolite, and meanwhile a small amount of ammonia nitrogen contained in the inlet water is also removed through absorption, such that the suspended solids with large particle sizes and parts of DO are removed;

(3) passing the sewage into the second filter bed 19 after going through the first filter bed 18, wherein due to the aquosity of vermiculite, the effective volume of the second filter bed is increased, such that the retention time of waterpower is prolonged, which further consumes the DO contained in the inlet water; and meanwhile due to the high aquosity of the vermiculite, a stable water-bearing layer can be formed in the vermiculite layer to avoid reoxygenation during cutoff or short-circuiting;

(4) passing the sewage discharged from the second filter bed 19 into a third filter bed 20, and opening a first pump 12 to enable a solution of ferrous chloride within a second chemical storage tank 11 to enter a third filter bed 20 along with the water flow via a first flow path 14; wherein denitrifying bacteria reduce nitrate, and nitrite into nitrogen by using a carbon source contained in the inlet water, and meanwhile some nitrate iron-oxidizing bacteria oxidize ferrous iron into ferric iron by using oxygen contained in nitrate and at the same time is reduced into nitrogen gas, the nitrogen gas is collected through a gas collecting device 9 and discharged from a gas outlet 10; furthermore suspended solids with small particle sizes are absorbed and intercepted, and meanwhile due to flocculation and adsorption of the ferric iron, the content of suspended solids contained in the outlet water is lower;

(5) flowing the sewage out from an opening underneath a supporting plate 25 after going through the third filter bed 20, and detecting the degree of the aforementioned redox reaction via an electrode of a redox potential measuring device 16, and then if the degree of the redox reaction is not sufficient, turning the second pump 13 on to enable a solution of ferrous chloride within the second chemical storage tank 11 to enter the third filter bed 20 along with the water flow via a second flow path 15, thereby increasing the concentration of the solution of ferrous chloride in the sewage and facilitating the progress of the redox reaction, and otherwise turning the second pump 13 off to reduce the concentration of the solution of ferrous chloride contained in the sewage, thereby achieving the action of automatic control; and (6) continually passing the sewage through the fourth filter bed 21 to perform further filtration and purification through the filtering material;

wherein the treated water enters a clean water tank 29 through a treated-sewage discharging pipe 26; a backwash pump 28 is turned on to a portion of water contained in the clean water tank 29 for backwash, the backwash is divided into three phases, wherein in a first phase of backwashing the third filter bed 20 a first outlet of backwash water 22 and a second outlet of backwash water 23 are turned off to make the backwash water be discharged via a third outlet of backwash water 24, in a second phase of backwashing the second filter bed, the first outlet of backwash water 22 and the third outlet of backwash water 24 are turned off to make the backwash water be discharged via the second outlet of backwash water 23, and in a third phase of backwashing the first filter bed 18, the second outlet of backwash water 23 and the third outlet of backwash water 24 are turned off to make the backwash water be discharged via the first outlet of backwash water 22, with a gas/water simultaneous backwash duration of 3-10 min, a strength of the backwash water of 8 L/m$^2$ s and a gas washing strength of 14 L/m$^2$ s, such that the backwash water flows back into the secondary sedimentation tank, and a portion of water which reaches the standard is discharged.

The zeolite and vermiculite filling material layers can effectively reduce the inhibition action of DO on the denitrification effect, and meanwhile intercept suspended solids with large particle sizes, as well as improving the pollutant carrying capacity of the quartz sand filtering material; ferrous chloride, which acts as an electron acceptor, plays a role in flocculation after being oxidized, such that the capability of the filter in intercepting the suspended solids is improved and the carbon-source dosage can be decreased from C/N=3-5 to C/N=1.9-2.2; the hydraulic loading rate is 1 m$^3$/m$^2$ h, the externally added COD/N=2, the concentration of ferrous chloride is 5 mg/L, and the changes of water-quality parameters when such an apparatus and method are used to processing the sewage: for the inlet water, the COD is 80-95 mg/L, TN is 18-26 mg/L, TP is 0.68-0.81 mg/L, SS is 19-34 mg/L, and NO3-N is 16-20 mg/L; and for the outlet water, the COD is 23-31 mg/L, TN is 2.1-4.2 mg/L, TP is 0.1-0.2 mg/L, SS is 1.8-3.2 mg/L, and NO—N is 1.1-2.4 mg/L. The backwash cycle was 29 h.

Example 2

Similar to Example 1, the filling material of the first filter bed 18 is zeolite with a selected particle size of 7.5 mm and a density of 2.2 g/cm$^3$; the filling material of the second filter bed 19 is vermiculite with a particle size of 2 mm; the filling material of the third filter bed 20 consists of quartz sand with a particle size of 3.6 mm, a density of 2.9 g/cm$^3$, and a porosity greater than 55%; the filtering material used in the fourth filter bed 21 consists of 15 parts of tuff, 6 parts of weakly-acidic clay, 3 parts of coral powder, 3.5 parts of coconut shell charcoal, 25 parts of ceramic powder, and 20.5 parts of organic foaming material by weight; the concentration of ferrous chloride is 3 mg/L, the externally added COD/N=1.9, and the changes of water-quality parameters under such a condition are: for the inlet water, the COD is 75-90 mg/L, TN is 19-25 mg/L, TP is 0.6-0.78 mg/L, SS is 20-33 mg/L, and NO3-N is 17-23 mg/L; and for the outlet water, the COD is 19-27 mg/L, TN is 1.9-3.2 mg/L, TP is 0.11-0.17 mg/L, SS is 1.7-2.9 mg/L, and NO—N is 1-2.1 mg/L. The backwash cycle was 30.5 h.

Example 3

Similar to Example 1, the filling material of the first filter bed 18 is zeolite with a selected particle size of 8 mm and a density of 2.4 g/cm$^3$, the filling material of the second filter bed 19 is vermiculite with a particle size of 3 mm; the filling material of the third filter bed 20 consists of quartz sand with a particle size of 4.2 mm, a density of 3.0 g/cm$^5$, and a porosity greater than 55%; the filtering material used in the fourth filter bed 21 consists of 20 pads of tuff, 2-10 parts of weakly-acidic clay, 5 parts of coral powder, 6 parts of coconut, shell charcoal, 40 parts of ceramic powder, and 25 parts of organic foaming material by weight the concentration of ferrous chloride is 10 mg/L, the externally added COD/N=2.2, and the changes of water-quality parameters under such a condition are: for the inlet water, the COD is 90-110 mg/L, TN is 19-25 mg/L, TP is 0.6-0.78 mg/L, SS is 20-33 mg/L, and NO3-N is 17-23 mg/L; and for the outlet water, the COD is 26-37 mg/L, TN is 2.94.1 mg/L. TP is 0.09-0.16 mg/L, SS is 2.7-3.7 mg/L, and NO—N is 0.9-2.2 mg/L. The backwash cycle was 27 h.

The aforementioned description is only preferred embodiments of the invention, rather than limiting the invention, and any modification, equivalent substitution and improvement within the spirit and principle of the invention should be included in the protection scope of the invention.

We claim:

1. An apparatus for sewage deep bed denitrification, comprising: a settling tank (2), an electrodialysis device (3), a pH adjusting tank (4), a first chemical storage tank (6), a biofilter (8), a second chemical storage tank (11), a redox potential measuring device (16), a backwash pump (28), and a clean water tank (29), wherein the settling tank (2), the electrodialysis device (3), the pH adjusting tank (4) and the biofilter (8) are connected through tubes, the first chemical storage tank (6) is communicated into the tubes of the pH adjusting tank (4) and the biofilter (8) through a first dosing port (5), the biofilter (8) is provided with a gas collecting device (9), a uniform water distributor (17), a first filter bed (18), a second filter bed (19), a third filter bed (20), and a fourth filter bed (21) sequentially from up to down, a certain distance is arranged between the first filter bed (18) and the second filter bed (19) and between the second filter bed (19) and the third filter bed (20), a supporting plate (25) is arranged at a bottom of the third filter bed (20), an opening protruding downward is arranged at a middle of the supporting plate (25), an electrode of the redox potential measuring device (16) is introduced into the opening, the fourth filter bed (21) is located underneath the opening at the middle of the supporting plate (25), a second dosing port (7) is arranged underneath the second filter bed (19), the second chemical storage tank (11) is communicated into the second dosing port (7) through a first flow path (14) and a second flow path (15) respectively, a first pump (12) is arranged on the first flow path (14), a second pump (13) is arranged on the second flow path (15), the redox potential measuring device (16) is connected with the second pump (13) through a wire, a bottom end of the biofilter (8) is connected with the clean water tank (29) through a treated-sewage discharging pipe (26), and the backwash pump (28) is arranged between the clean water tank (29) and the bottom end of the biofilter (8) through a backwash pipe (27).

2. The apparatus for sewage deep bed denitrification of claim 1, wherein a first outlet of backwash water (22), a second outlet of backwash water (23), and a third outlet of backwash water (24) are respectively arranged above the first filter bed (18), the second filter bed (19), and the third filter bed (20).

3. The apparatus for sewage deep bed denitrification of claim 1, wherein the uniform water distributor (17) consists of fractionation water distributing devices respectively comprising a water inlet manifold, a main pipe, a branch pipe and a water distributor having uniformly arranged water distributing holes.

4. The apparatus for sewage deep bed denitrification of claim 1, wherein the first filter bed (18) comprises a filling material, and wherein the filling material of the first filter bed (18) is zeolite with a selected particle size of 7-8 mm and a density of 2.0-2.4 g/cm$^3$.

5. The apparatus for sewage deep bed denitrification of claim 1, wherein the second filter bed (19) comprises a filling material, and wherein the filling material of the second filter bed (19) is vermiculite with a particle size of 1-3 mm.

6. The apparatus for sewage deep bed denitrification of claim 1, wherein the third filter bed (20) comprises a filling material, and wherein the filling material of the third filter bed (20) consists of quartz sand with a selected particle size of 3-4.2 mm, a density of 2.8-3.0 g/cm$^3$ and a porosity greater than 55%.

7. The apparatus for sewage deep bed denitrification of claim 1, wherein the fourth filter bed (21) comprises a filling material.

8. The apparatus for sewage deep bed denitrification of claim 1, wherein chemicals within the first chemical storage tank (6) is a mixed solution of sodium acetate and methanol with a molar ratio thereof of 1:3.

9. The apparatus for sewage deep bed denitrification of claim 1, wherein chemicals within the second chemical storage tank (11) is a solution of ferrous chloride with a concentration of 3-10 mg/L.

10. A sewage deep bed denitrification processing method, which employs the apparatus of claim 1, wherein the method comprises the steps of:

(1) introducing a secondary biochemical effluent into the settling tank (2) through a raw-water inlet (1) to perform preliminary sedimentation, then introducing into the electrodialysis device (3) to perform electrolysis, continually introducing into the pH adjusting tank (4) to adjust the pH value to 5.0-7.0, wherein a chemical solution within the first chemical storage tank (6) is fed through the first dosing port (5) into the tube connecting the pH adjusting tank (4) to the biofilter (8), such that the chemical solution enters the biofilter (8) along with sewage, making a COD/N of externally added carbon source in inlet water=2;

(2) first passing the sewage through the first filter bed (18) via the uniform water distributor (17), wherein suspended solids in the inlet water is removed under absorption and interception actions of zeolite, and meanwhile ammonia nitrogen contained in the inlet water is also removed through absorption, such that the suspended solids with large particle sizes and parts of DO are removed;

(3) passing the sewage into the second filter bed (19) after going through the first filter bed (18), wherein due to an aquosity of vermiculite, an effective volume of the second filter bed (19) is increased, such that the retention time of waterpower is prolonged, which further consumes the DO contained in the inlet water;

(4) passing the sewage discharged from the second filter bed (19) into the third filter bed (20), and opening the first pump (12) to enable a solution of ferrous chloride within the second chemical storage tank (11) to enter the third filter bed (20) along with a water flow via the first flow path (14); wherein denitrifying bacteria reduce the nitrate and nitrite into nitrogen by using a carbon source contained in the inlet water, and meanwhile some nitrate iron-oxidizing bacteria oxidize ferrous iron into ferric iron by using oxygen contained in nitrate and at the same time is reduced into nitrogen gas; the nitrogen gas is collected through the gas collecting device (9) and discharged from a gas outlet (10), suspended solids with small particle sizes are absorbed and intercepted, and meanwhile due to flocculation and adsorption of the ferric iron, a content of suspended solids contained in outlet water is lower;

(5) flowing the sewage out from the opening underneath the supporting plate (25) after going through the third filter bed (20), and detecting a degree of redox reaction via the electrode of the redox potential measuring device (16), and then if the degree of the redox reaction is not sufficient, turning the second pump (13) on to enable a solution of ferrous chloride within the second chemical storage tank (11) to enter the third filter bed (20) along with the water flow via the second flow path (15), thereby increasing a concentration of the solution of ferrous chloride in the sewage and facilitating progress of the redox reaction, and otherwise turning the second pump (13) off to reduce the concentration of the solution of ferrous chloride contained in the sewage, thereby achieving action of automatic control; and (6) continually passing the sewage through the fourth filter bed (21) to perform further filtration and purification through a filtering material;

(7) wherein treated water enters the clean water tank (29) through a treated-sewage discharging pipe (26); the backwash pump (28) is turned on to use a portion of water contained in the clean water tank (29) for backwash, the backwash is divided into three phases, wherein in a first phase of backwashing the third filter bed (20) a first outlet of backwash water (22) and a second outlet of backwash water (23) are turned off to make the backwash water be discharged via a third outlet of backwash water (24), in a second phase of backwashing the second filter bed, the first outlet of backwash water (22) and the third outlet of backwash water (24) are turned off to make the backwash water be discharged via the second outlet of backwash water (23), and in a third phase of backwashing the first filter bed (18), the second outlet of backwash water (23) and the third outlet of backwash water (24) are turned off to make the backwash water be discharged via the first outlet of backwash water (22), such that the backwash water flows back into a secondary sedimentation tank, and a portion of water is discharged.

* * * * *